UNITED STATES PATENT OFFICE.

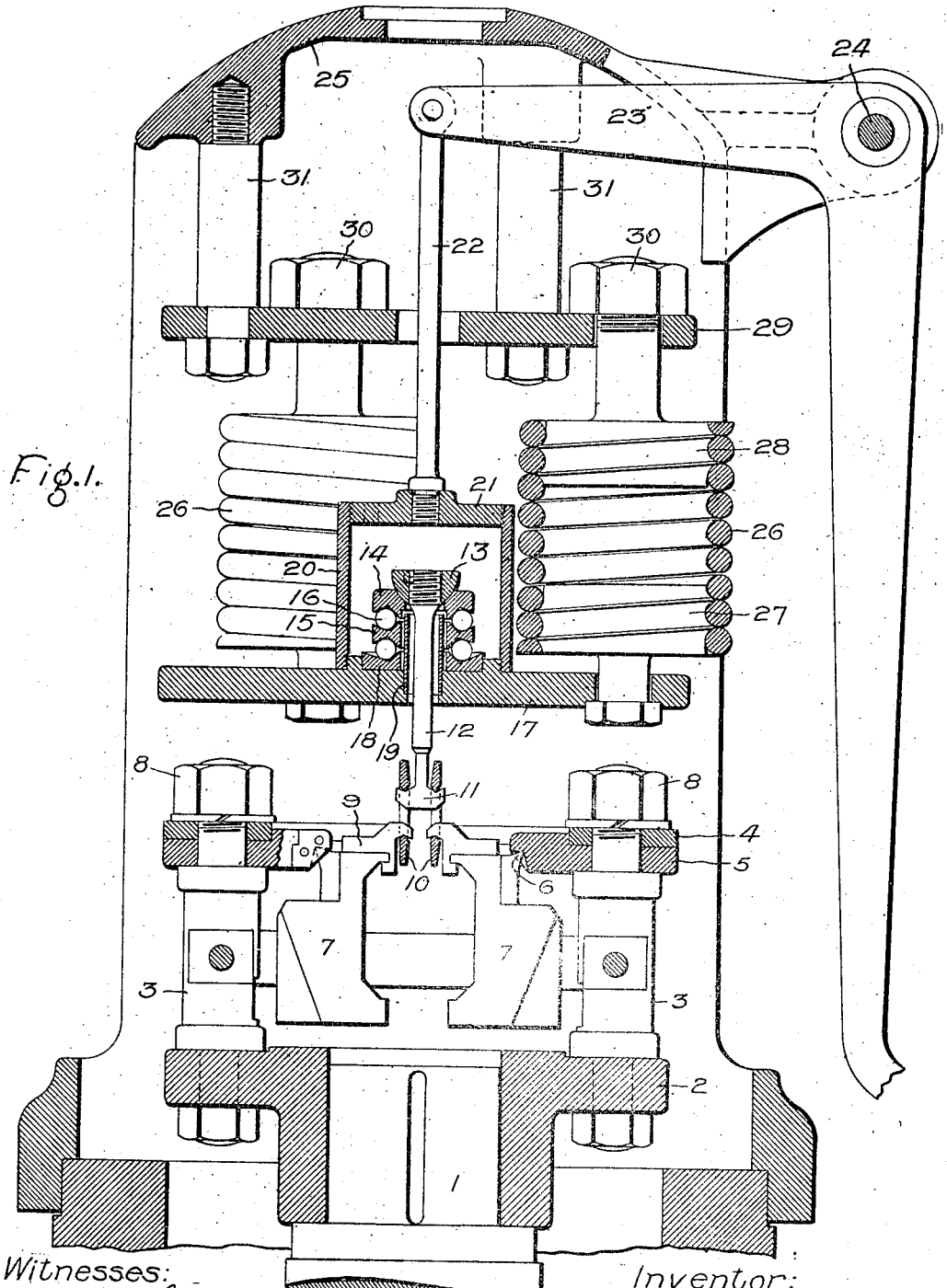

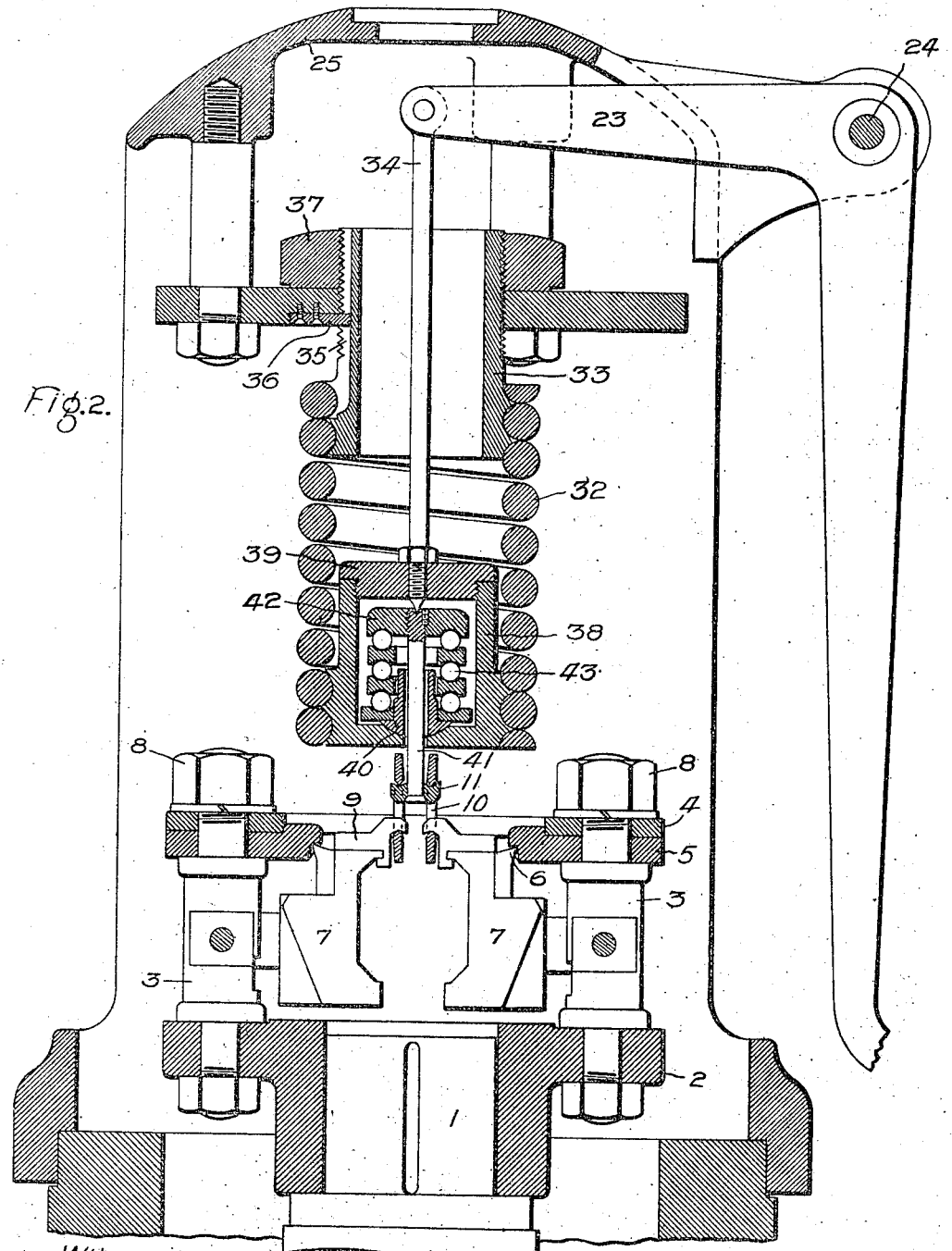

OLIVER D. H. BENTLEY, OF WASHINGTON, DISTRICT OF COLUMBIA, ASSIGNOR TO GENERAL ELECTRIC COMPANY, A CORPORATION OF NEW YORK.

CENTRIFUGAL GOVERNOR.

No. 825,180.  Specification of Letters Patent.  Patented July 3, 1906.

Application filed December 9, 1904. Serial No. 236,160.

*To all whom it may concern:*

Be it known that I, OLIVER D. H. BENTLEY, a citizen of the United States, residing at Washington, District of Columbia, have invented certain new and useful Improvements in Centrifugal Governors, of which the following is a specification.

Considerable difficulty is experienced at the present time in building centrifugal governors for elastic-fluid turbines and kindred machines having a relatively high rotative speed, owing to the difficulty in properly balancing the rotating springs and other parts. The greatest of the difficulties is encountered in making the springs, and few workmen are found who can satisfactorily do the work, and even when these men are found it requires especially careful work on their part to obtain good results. This will be apparent when it is considered that the springs are heavy, that the cross-section of metal in the spring must be equal at every point measured in axial planes, that each turn must exert the same force as every other turn, and that the spring must be balanced both statically and dynamically. Any substantial amount of vibration due to the lack of balance will result in ruining the governor. Again, these governors require an adjustable synchronizing spring in addition to the main rotating spring, so that the speed of the machine can be varied to cause it to take its proper proportion of a given load.

My invention has for its object to provide a governor of improved construction wherein the objections above set forth are avoided. I also aim to simplify the construction and to reduce the initial cost and also that of maintenance.

In carrying out my invention two or more carefully-balanced weights are provided, which are supported on knife-edges and move toward and away from the axis of rotation as the speed changes. The weights act in opposition to one or more springs. When one spring is employed it is preferably of the coiled type and concentrically disposed with respect to the axis of the shaft carrying the weight, so as to exert its effort equally at all points on the abutments. One of the abutments is fixed to a dome or other support and the other is movable. When two or more springs are employed, they should be so disposed that they exert equal or substantially equal effects on the movable abutment. Between the weights and the movable abutment is a connection which includes a slip-joint. This joint should be as free as possible from friction. Since the speed of the shaft and weights is relatively high, a means should be employed for reducing the relative motion between them and the abutment carried by the free end of the spring or springs. Two or more ball or roller bearings may be employed for this purpose. Other things being equal, the higher the speed of the shaft the greater should be the number of motion-reducing devices. In operation one part moves on one set of balls or rollers, which in turn is supported by and moves on another set, and so on, the angular speed of each part gradually reducing. By using a stationary spring or springs it or they can be adjusted when the machine is running at full speed. This dispenses with the usual synchronizing spring. To the weights or movable abutment is connected a lever or other means for transmitting motion from them or it to the valve mechanism itself or to a means that controls or operates the valve mechanism. The connection between the weights and the movable abutment may also with advantage include a self-alining device to prevent undue friction.

In the accompanying drawings, which illustrate embodiments of my invention, Figure 1 is a longitudinal section of a governor having three stationary springs, and Fig. 2 is a longitudinal section of a governor having a single stationary spring.

1 represents the shaft of a turbine or other machine to be governed. Mounted on the end of the shaft is a head 2, which supports upright pillars or posts 3, the latter being connected by a ring 4 to form a frame. The upper ends of each of the posts, of which two or more may be provided, have shoulders, and resting on these shoulders are blocks 5, which form seats for the knife-edges 6 on the centrifugally-acting weights 7. The ring and blocks are held in place by nuts 8 or equivalent means. To each weight is secured a piece 9, having a hook-like projection which engages with a link 10. The links engage with an inverted-T-shaped head 11, formed on the lower end of the rod 12. On the upper end of the rod is a spherical enlargement 13, which rests on the plate 14. Owing to the spherical surfaces on the enlargement 13 and plate 14, provision is made whereby the parts can aline themselves, and thus avoid excessive internal friction. Situated below the plate 14 is a ring 15, containing grooves located above and below it. These grooves form ball-races to receive the balls or rollers 16.

17 represents the movable abutment, and seated therein is a ring 18, having a ball-race on its upper surface. Surrounding the rod 12 and seated in the abutment is a sleeve 19, which prevents excessive lateral movement of the head 14 and ring 15 when the pressure thereon is removed. The head, rings, and rows of balls or rollers constitute a motion-reducing device and also a slip-joint. Surrounding the motion-reducing device is a cylinder 20, that is adapted to contain some sort of lubricating material to lubricate the balls or rollers. To the upper end of the cylinder is attached a head 21, and to the latter is secured a vertically-extending rod 22. The upper end of the rod is attached to a bell-crank lever 23, the latter being supported by a pivot 24, carried by extensions on the dome 25. The lower end of the bell-crank lever is connected by any suitable means with the valve mechanism or the mechanism controlling the valves.

In the present form of the governor there stationary extension-springs 26 are provided, which are located one hundred and twenty degrees apart and at the same radial distance from the axis of the rod 12. The springs are of the extension type and are secured to screw-threaded heads 27 and 28. The former is provided with a screw-threaded extension which passes through the movable abutment 17 and is adapted to receive a retaining-nut. The head 28 is also provided with a screw-threaded extension which extends upward though the plate or stationary abutment 29. On the end of each of these projections is an adjusting-nut 30, whereby the tension on the spring can be varied. The plate 29 may be supported from the dome in any suitable manner. In the present instance it is supported by three downwardly-extending posts 31. If desired, I may dispense with the plate 29 and the posts and extend the projections on the heads 28 through the top of the dome. When this is done, the projections must be so arranged that they will not interfere with the movements of the bell-crank lever 23. As the speed of the shaft increases the weights 7 move outwardly, thereby moving the abutment 17 in a downward direction and increasing the tension on the springs 26. As the abutment moves downward motion is imparted to the rod 22, which in turn imparts movement to the bell-crank lever 23 and to the mechanism actuated thereby.

Referring to Fig. 2, I have shown a slight modification in the arrangement of the stationary spring and also in the means for transmitting motion from the weights to the movable abutment. 32 represents the stationary spring, which is concentrically mounted with respect to the axis of the shaft. The upper end of the spring is attached to a screw-threaded head 33, which is provided with a central opening to receive the connecting-rod 34. In order to prevent the sleeve from turning, it is slotted, as at 35, and entering the slot is a feather 36, which permits the sleeve to be moved up and down by means of the adjusting-nut 37, but prevents it from rotating. To the lower end of the spring is attached a movable abutment 38, which is provided with a screw-threaded head 39, that receives the lower end of the connecting-rod 34. The lower end of the abutment is provided with a spherical seat to receive the sleeve 40, the lower end of which is provided with a spherical enlargement corresponding in shape to the seat. This arrangement constitutes a self-alining device to prevent undue friction and also serves to prevent excessive lateral movement of the ball races or rings and the balls when the strain on the spring is decreased. Extending upwardly through the cylinder 40 and connected to the weights, by means of links, is a rod 41. On the upper end of the rod is a head 42, in which is formed a seat to receive the pointed end of the rod 34, the said point and seat therefor being hardened. The under side of the head 42 is provided with a groove or ball-races to receive the balls 43. Underneath the upper row of balls is a ring provided with upper and lower grooves or ball-races. As many of these devices may be employed as desired. The advantage of this construction over the one previously described resides principally in the fact that only one spring is employed, which may be adjusted by a single means.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a shaft-governor, the combination of weights mounted on a revolving shaft, a movable abutment connected to the weights through a slip-joint, and a non-rotatable coiled spring located between the weights and the abutment which opposes the action of the weights.

2. In a shaft-governor, the combination of weights mounted on a revolving shaft, a movable abutment, a connection between the weights and the abutment, a motion-reducing device included in said connection, and a non-rotatable spring attached to the movable abutment and a fixed support.

3. In a shaft-governor, the combination of weights mounted on a revolving shaft, a movable abutment, a connection between the weights and the abutment, a motion-reducing device included in said connection, a spring attached to the movable abutment and a fixed support, and an actuator attached to and moving with the weights.

4. In a shaft-governor, the combination of weights mounted on a revolving shaft, a movable abutment, a connection between the weights and the abutment, two or more motion-reducing devices arranged one on the other and included in the connection, and a spring attached to the movable abutment and a fixed support.

5. In a shaft-governor, the combination of a head, weights pivotally mounted thereon, a movable abutment, a connection between the weights and the abutment including a slip-joint, a stationary support, an abutment, a stationary coiled spring connected to the abutment, and a lever which is connected to and is actuated by the movable weights.

6. In a shaft-governor, the combination of weights, a frame which carries the weights and is adapted to be mounted on a shaft, a movable abutment, a dome, a stationary spring connected at one end to the abutment and at the other end to the dome, a connection between the weights and the lever including a slip-joint, a lever pivoted to the dome, and a connection between the movable abutment and the lever.

7. In a shaft-governor, the combination of weights, a frame which carries the weights and is adapted to be mounted on a shaft, a movable abutment, a dome, a stationary spring connected at one end to the abutment and at the other end to the dome, means for adjusting the tension of the spring, a connection between the weights and the abutment including a plurality of motion-reducing devices, and a means for transmitting motion from the abutment to the mechanism being controlled.

8. In a shaft-governor, the combination of weights, a stationary spring, a movable abutment attached to the spring, a means for transmitting the motion of the weights to the device being controlled, a connection between the weights and the abutment, a slip-joint in the connection, and a self-alining device also included in the connection.

9. In a shaft-governor, the combination of weights, a stationary spring, a movable abutment attached to the spring, a means for transmitting the motion of the weights to the device being controlled, a connection between the weights and the abutment, and a motion-reducing and a self-alining device included in the connection.

In witness whereof I have hereunto set my hand this 7th day of December, 1904.

OLIVER D. H. BENTLEY.

Witnesses:
L. HOLST,
J. HARRIS FRANKLIN.